(12) United States Patent
Song et al.

(10) Patent No.: US 11,038,797 B2
(45) Date of Patent: Jun. 15, 2021

(54) FORWARDING TABLE ENTRY ACCESS

(71) Applicant: NEW H3C TECHNOLOGIES CO., LTD., Hangzhou (CN)

(72) Inventors: Jianming Song, Beijing (CN); Yunfeng Zhao, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 63 days.

(21) Appl. No.: 16/309,863

(22) PCT Filed: Jul. 4, 2017

(86) PCT No.: PCT/CN2017/091599
§ 371 (c)(1),
(2) Date: Dec. 13, 2018

(87) PCT Pub. No.: WO2018/006786
PCT Pub. Date: Jan. 11, 2018

(65) Prior Publication Data
US 2019/0260678 A1 Aug. 22, 2019

(30) Foreign Application Priority Data
Jul. 4, 2016 (CN) .......................... 201610528199.4

(51) Int. Cl.
H04L 12/743 (2013.01)
H04L 12/755 (2013.01)
H04L 12/747 (2013.01)

(52) U.S. Cl.
CPC ........ H04L 45/7453 (2013.01); H04L 45/021 (2013.01); H04L 45/742 (2013.01)

(58) Field of Classification Search
CPC . H04L 45/7453; H04L 45/021; H04L 45/742; H04L 45/745; H04L 67/2842;
(Continued)

(56) References Cited

U.S. PATENT DOCUMENTS 5,978,951 A 11/1999 Lawler et al.
6,430,184 B1 * 8/2002 Robins ............... H04L 12/5601
370/392
(Continued)

FOREIGN PATENT DOCUMENTS

CN 1863169 A 11/2006
CN 101079817 A 11/2007
(Continued)

OTHER PUBLICATIONS

ISA State Intellectual Property Office of the People's Republic of China, International Search Report Issued in Application No. PCT/CN2017/091599, dated Sep. 15, 2017, WIPO, 4 pages.
(Continued)

*Primary Examiner* — Ricky Q Ngo
*Assistant Examiner* — Michael K Phillips
(74) *Attorney, Agent, or Firm* — McCoy Russell LLP

(57) ABSTRACT

A method for accessing a forwarding entry and a network device are provided. In an example, a cache receives, from a forwarding component, an entry reading command which carries a storage address in a storage of a first forwarding entry to be read. The cache locally searches for a first Hash bucket in a valid state according to the storage address of the first forwarding entry, the first Hash bucket containing a storage address identical to that of the first forwarding entry. If the first Hash bucket is found, the cache transmits, to the forwarding component, the first forwarding entry cached in cache space corresponding to the first Hash bucket. If not found, the cache reads the first forwarding entry from the storage and transmits the first forwarding entry to the forwarding component when the first Hash bucket is not found.

13 Claims, 7 Drawing Sheets

| | ◄——80bit——► | | | ◄Entry width► | |
|---|---|---|---|---|---|
| bucket line 0 | bucket0 | bucket1 | entry line 0 | entry0 | entry1 |
| bucket line 1 | bucket0 | bucket1 | entry line 1 | entry0 | entry1 |
| bucket line 2 | bucket0 | bucket1 | entry line 2 | entry0 | entry1 |
| bucket line 3 | bucket0 | bucket1 | entry line 3 | entry0 | entry1 |
| | ... | ... | | ... | ...... |
| | ... | ... | | ... | |
| bucket line n | bucket0 | bucket1 | entry line n | entry0 | entry1 |
| bucket line n+1 | bucket0 | bucket1 | entry line n+1 | entry0 | entry1 |
| bucket line n+2 | bucket0 | bucket1 | entry line n+2 | entry0 | entry1 |
| bucket line n+3 | bucket0 | bucket1 | entry line n+3 | entry0 | entry1 |

(58) Field of Classification Search
CPC ..... H04L 69/22; H04L 1/1678; H04L 9/3297; G06F 12/0895; G06F 12/0897; G06F 16/2255; G06F 16/9014; G06F 12/0864; G06F 16/9574; G06F 12/0811; G06F 12/0868; G06F 16/172

See application file for complete search history.

(56) References Cited

U.S. PATENT DOCUMENTS

| | | | |
|---|---|---|---|
| 6,850,980 | B1 | 2/2005 | Gourlay |
| 7,039,764 | B1* | 5/2006 | Shetty ................. G06F 16/9014 711/133 |
| 7,808,971 | B2 | 10/2010 | Miller |
| 7,822,927 | B1 | 10/2010 | Scheer |
| 8,914,574 | B2 | 12/2014 | Pan et al. |
| 10,397,362 | B1* | 8/2019 | Volpe ................. G06F 12/0891 |
| 2006/0242300 | A1 | 10/2006 | Yumoto et al. |
| 2007/0028051 | A1* | 2/2007 | Williamson ........ G06F 12/0864 711/128 |
| 2007/0127382 | A1* | 6/2007 | Hussain ................ H04L 45/586 370/235 |
| 2009/0161547 | A1* | 6/2009 | Riddle .................. H04L 69/161 370/236 |
| 2012/0173844 | A1* | 7/2012 | Punde ................. G06F 12/0895 711/216 |
| 2013/0046922 | A1 | 2/2013 | Pan et al. |
| 2014/0201307 | A1 | 7/2014 | Banavalikar et al. |
| 2016/0098353 | A1* | 4/2016 | Shiu ...................... G06F 3/0673 711/133 |
| 2017/0118180 | A1* | 4/2017 | Takahashi ............. H04L 9/0819 |

FOREIGN PATENT DOCUMENTS

| | | |
|---|---|---|
| CN | 101197787 A | 6/2008 |
| CN | 102736986 A | 10/2012 |
| CN | 103595637 A | 2/2014 |
| CN | 104809179 A | 7/2015 |
| CN | 105243030 A | 1/2016 |
| CN | 105357314 A | 2/2016 |
| CN | 105446897 A | 3/2016 |
| CN | 105630703 A | 6/2016 |
| EP | 1408659 A1 | 4/2004 |
| JP | 2001290718 A | 10/2001 |
| JP | 2004023450 A | 1/2004 |
| JP | 2007221514 A | 8/2007 |
| JP | 2011239299 A | 11/2011 |
| WO | 2008121690 A2 | 10/2008 |

OTHER PUBLICATIONS

State Intellectual Property Office of the People's Republic of China, Office Action and Search Report Issued in Application No. 201610528199.4, dated Jul. 3, 2019, 10 pages. (Submitted with Partial Translation).

Japanese Patent Office, Office Action Issued in Application No. 2019-500254, dated Nov. 1, 2019, 5 pages. (Submitted with Machine Translation).

ISA State Intellectual Property Office of the People's Republic of China, Written Opinion of the International Searching Authority Issued in Application No. PCT/CN2017/091599, dated Sep. 15, 2017, WIPO, 4 pages.

European Patent Office, Extended European Search Report Issued in Application No. 17823598.2, dated Apr. 25, 2019, Germany, 10 pages.

State Intellectual Property Office of the People's Republic of China, Office Action and Search Report Issued in Application No. 201610528199.4, dated Mar. 6, 2020, 14 pages. (Submitted with Machine Translation).

Japanese Patent Office, Notice of Rejection Decision Issued in Application No. 2019-500254, dated Jun. 2, 2020, 6 pages. (Submitted with Machine Translation).

State Intellectual Property Office of the People's Republic of China, Office Action and Search Report Issued in Application No. 201610528199.4, dated Sep. 25, 2020, 14 pages. (Submitted with Machine Translation).

Wang, W., "Research on the Storage Structure Based on Hash Forwarding," China Master's Theses Full-text Database, Oct. 15, 2010, 71 pages. (Submitted with English Abstract).

* cited by examiner

| Valid | Time stamp | Addr |
|---|---|---|

FORWARDING TABLE ENTRY ACCESS

CROSS REFERENCE TO RELATED APPLICATIONS

The present application is a U.S. National Phase of International Patent Application Serial No PCT/CN2017/091599 entitled "FORWARDING TABLE ENTRY ACCESS," filed on Jul. 4, 2017. International Patent Application Serial No. PCT/CN2017/091599 claims priority to Chinese Patent Application No. 201610528199.4 filed on Jul. 4, 2016. The entire contents of each of the above-cited applications are hereby incorporated by reference in their entirety for all purposes.

BACKGROUND

Network devices such as switches or routers may forward packets by querying forwarding tables. These forwarding tables are mostly stored in a storage medium, such as double data rate synchronous dynamic random access memory (DDR SDRAM). The network devices may query, after receiving packets, the forwarding tables in the DDR SDRAM in order for forwarding the packets.

Using the above method, querying of the forwarding tables may be directly performed in the DDR SDRAM. However, the bandwidth of a DDR SDRAM is limited, and thus cannot satisfy requirements for high forwarding performance of the network devices.

DETAILED DESCRIPTION OF THE EMBODIMENTS

Exemplary examples will be described in detail with reference to the accompanying drawings. The following description refers to the accompanying drawings in which the same numbers in different drawings represent the same or similar elements unless otherwise represented. The implementations set forth in the following exemplary examples do not represent all implementations consistent with the present disclosure. Instead, they are merely examples of apparatuses and methods consistent with aspects related to the disclosure as recited in the appended claims.

Following examples of the present disclosure provide a method for accessing a forwarding entry and a network device into which the method may be applied.

Figure 1:
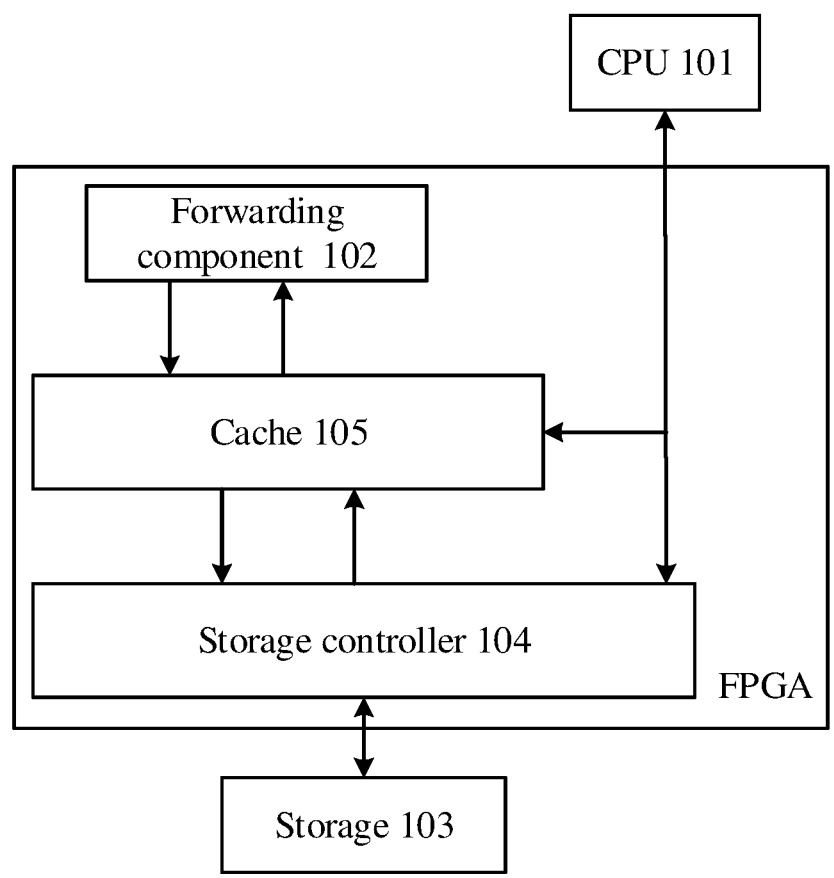
FIG. 1 illustrates a schematic structural diagram of a network device according to an exemplary example of the present disclosure.

As shown in FIG. 1, a network device for forwarding a packet such as a switch or a router may include a central processing unit (CPU) 101, a forwarding component 102, a storage 103 (such as DDR SDRAM) configured to store each forwarding table and a storage controller 104 configured to control read-write of the storage 103. For accessing a forwarding entry, a forwarding table may be stored in the storage 103. In this way, for forwarding a packet, the forwarding component 102 is to search the forwarding table in the storage 103 for a corresponding forwarding entry. However, according to the examples of the present disclosure, a cache 105 is added between the forwarding component 102 and the storage 103 to cache forwarding entries queried by the forwarding component 102. The forwarding component 102 and the cache 105 may be a separate hardware chip, or may be implemented by means of a field programmable gate array (FPGA) technology, which is not limited. In the examples of the present disclosure, the forwarding component 102 and the cache 105 may be implemented as programmable modules on an FPGA chip. The FPGA chip may be further provided with the storage controller 104.

An FPGA framework document may be loaded by the CPU 101 onto the FPGA chip to be executed by the FPGA chip, so that the FPGA chip includes the forwarding component 102, the cache 105 and the storage controller 104. The CPU 101 may be connected via a system bus to various components such as the forwarding component 102, the storage 103, the storage controller 104 and the cache 105 and may provide centralized control of these components.

The forwarding table stored in the storage 103 mainly has the following two characteristics:

Characteristic I: the forwarding table is to be updated with a very low frequency, particularly the forwarding table is not updated when testing line speed.

Characteristic II: when update of a forwarding entry occurs in the forwarding table, the forwarding component does not need to synchronously read the updated forwarding entry, that is, packet forwarding may still be correctly performed even though the forwarding component reads the updated forwarding entry a little later.

Based on the above two characteristics, in the following examples of the present disclosure, an entry reading command sent by the forwarding component 102 may be processed via the cache 105. Entry writing commands sent by the CPU 101, the forwarding component 102 or other modules on which forwarding entries are to be updated do not need to be processed via the cache 105. The cache 105 may only monitor entry writing commands sent to the storage 103 to learn which forwarding entry is to be updated, and update the state of cached corresponding forwarding entry to be invalid. When the forwarding component 102 sends an entry reading command to read an updated forwarding entry, the cache 105 acquires the updated forwarding entry from the storage 103 and caches the updated forwarding entry.

The above forwarding table may be, for example, a routing table, an MAC address table or an ARP table, which is not limited by the examples of the present disclosure.

Figure 2:
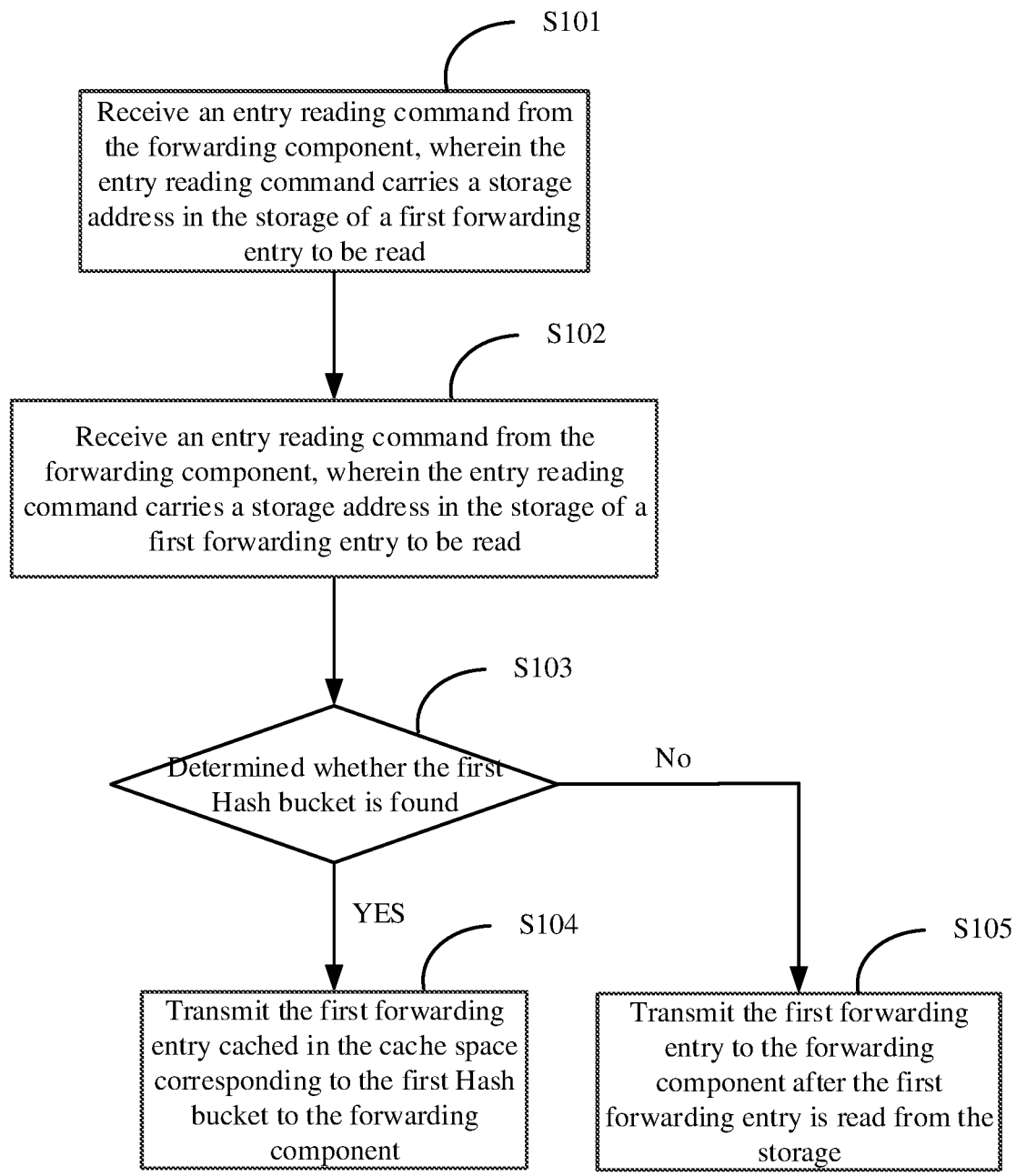
FIG. 2 illustrates a flowchart of processing, by a cache, an entry reading command sent from a forwarding component according to an exemplary example of the present disclosure.

Thus, as shown in FIG. 2, the method for accessing a forwarding entry performed by the cache 105 in the examples of the present disclosure may include the following blocks.

At block S101, an entry reading command sent from the forwarding component may be received, wherein the entry reading command carries a storage address in the storage of a first forwarding entry to be read.

For example, the storage address of the first forwarding entry is a starting address stored in the storage of the first forwarding entry.

At block S102, a first Hash bucket in a valid state may be locally searched for according to the storage address of the first forwarding entry, wherein the first Hash bucket contains a storage address identical to the storage address of the first forwarding entry.

The cache 105 may include a Hash table, which may include a plurality of Hash bucket lines. Each Hash bucket line may include one or more Hash buckets, and each Hash bucket has a corresponding cache space. Generally, the Hash bucket corresponds to the cache space one to one, or a pointer is set up in the Hash bucket, so that a plurality of Hash buckets may point to a section of cache space by pointers.

In the examples of the present disclosure, reference may be made by taken an example in which a Hash bucket corresponds to cache space one to one, and the cache space corresponding to the Hash bucket may be referred to as an entry. Thus, a Hash bucket line corresponds to an entry line one to one, and Hash buckets in the Hash bucket line correspond to entries in the entry line one to one. The entry may be configured to save the content of a forwarding entry. The Hash bucket may include: a state tag for indicating whether the forwarding entry is valid, a storage address of the forwarding entry in the storage, and a timestamp. The Hash bucket line may have an identifier uniquely identifying the Hash bucket line.

Figure 3:
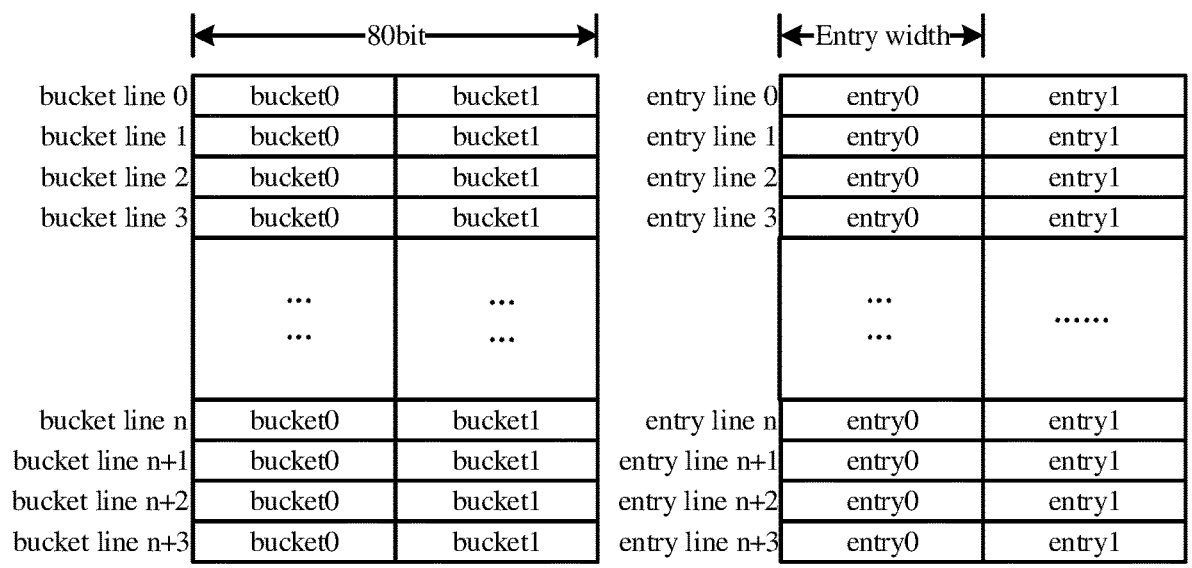
FIG. 3 illustrates a schematic structural diagram of a Hash bucket line and an entry line according to an exemplary example of the present disclosure.

Reference may be made by taking FIG. 3 as an example. The Hash table of the cache 105 may include n+4 Hash bucket lines, namely, bucket line 0~bucket line n+3, and n+4 entry lines, namely, entry line 0~entry line n+3; wherein the bucket line 0 may correspond to the entry line 0, the bucket line 1 may correspond to the entry line 1, and so on. Each Hash bucket line may store two Hash buckets, for example, bucket0 and bucket1, and each entry may also store two entries, for example, entry0 and entry1; wherein the bucket0 in the bucket line 0 may correspond to the entry0 in the entry line 0, the bucket1 in the bucket line 0 may correspond to the entry1 in the entry line 0, and so on. The size of each Hash bucket may be set as 40 bits, and the size of each entry may be set as 32 bytes.

Figures 4, 5:
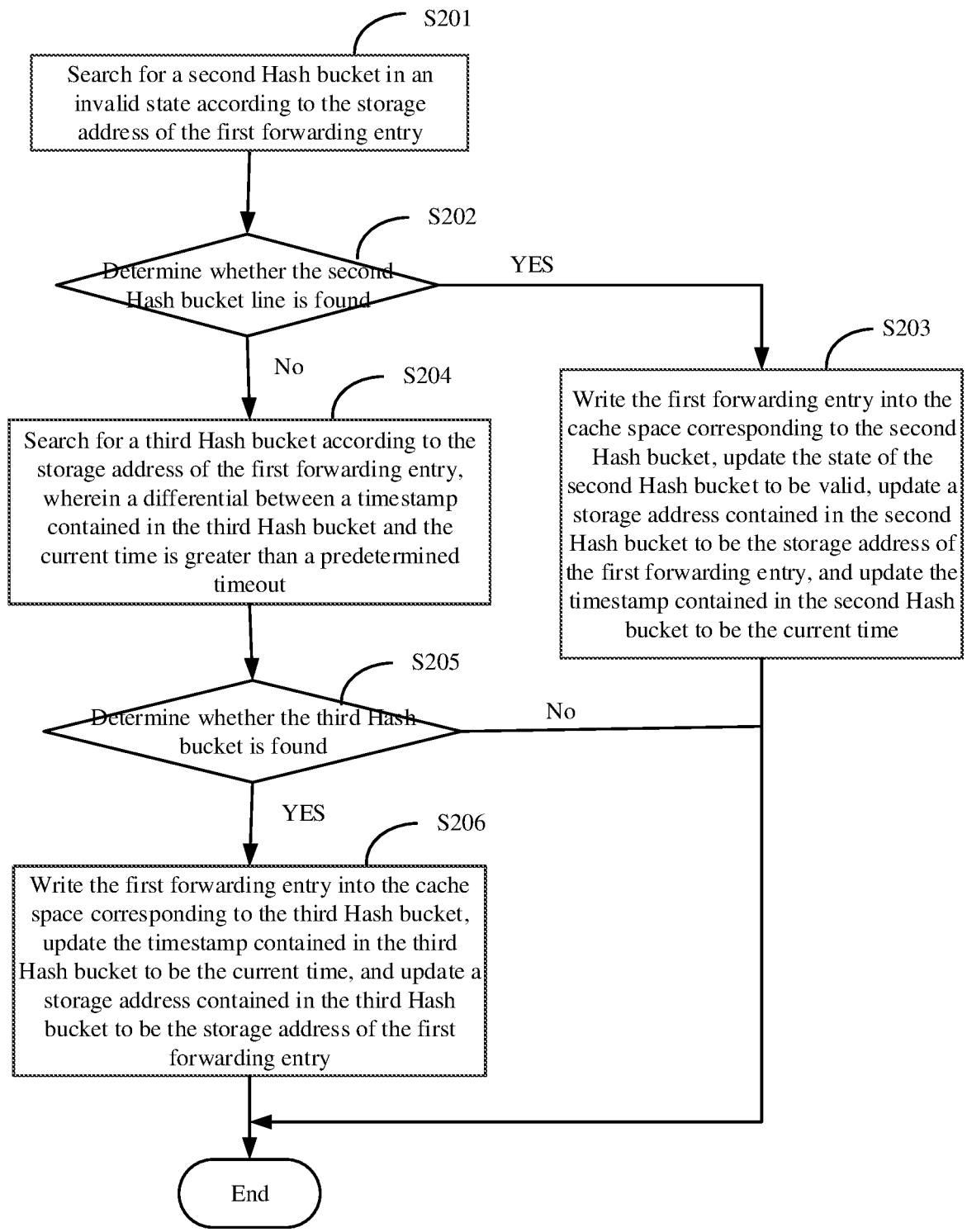
FIG. 4 illustrates a schematic structural diagram of a Hash bucket according to an exemplary example of the present disclosure.
FIG. 5 illustrates a flowchart of caching, by a cache, a first forwarding entry read from a storage according to an exemplary example of the present disclosure.

As shown in FIG. 4, each Hash bucket may include the following fields: valid, time stamp and Addr.

Valid: a state tag, used for indicating whether a forwarding entry stored in a corresponding entry is valid. For example, when the Valid is set as 0, this indicates that the forwarding entry cached in the corresponding entry is invalid, or the content of the corresponding entry is empty, that is, no forwarding entry is cached in the entry. During initialization, the Valid may be set as 0 by default. When the Valid is set as 1, this indicates that the forwarding entry cached in the corresponding entry is valid; and the Valid may occupy one bit, for example, bit 39.

Time stamp: a timestamp, the timestamp may be updated to be the current time each time when the Hash bucket is hit; and the Time stamp may occupy nine bits, for example, bit38~bit30.

Addr: a storage address, of the forwarding entry in the corresponding entry, in the storage; the Addr may occupy 30 bits, for example, bit 29~bit 0.

Thus, at block S102, Hash operation may be performed on the storage address of the first forwarding entry carried in the entry reading command so as to obtain a Hash value, and the obtained Hash value may be used as an index to search for a corresponding Hash bucket line, which may be referred to as a first Hash bucket line for convenience of description. Next, the first Hash bucket may be searched for from the first Hash bucket line. It is determined that the first forwarding entry is cached in the first entry corresponding to the first Hash bucket when the first Hash bucket is found. Otherwise, it is determined that the first forwarding entry is not cached in the cache 105.

The above Hash operation may be a CRC (cyclic redundancy check) operation or an XOR (exclusive OR) operation, etc.

At block S103, it is determined whether the first Hash bucket is found, block S104 may be performed when the first Hash bucket is found; otherwise block S105 may be performed.

At block S104, the first forwarding entry cached in the cache space corresponding to the first Hash bucket may be transmitted to the forwarding component.

Specifically, the first forwarding entry cached in the first entry corresponding to the first Hash bucket may be transmitted to the forwarding component. In addition, the timestamp contained in the first Hash bucket may be updated to be the current time.

At block S105, after the first forwarding entry is read from the storage, the first forwarding entry may be transmitted to the forwarding component.

For example, at block S105, the cache 105 may transmit, to the storage 103, an entry reading command for indicating to read the first forwarding entry. After receiving the entry reading command, the storage controller 104 may read the first forwarding entry from the storage 103 and transmit the first forwarding entry to the cache 105. After receiving the first forwarding entry, the cache 105 may forward the first forwarding entry to the forwarding component 102.

In the examples of the present disclosure, only one forwarding component is illustrated, which is not restrictive. Also a case where the cache 105 corresponds to a plurality of forwarding components may exist. In such a case, the cache 105 may receive entry reading commands sent from a plurality of forwarding components. Therefore, when receiving an entry reading command sent from each forwarding component, the cache 105 may record a corresponding relationship between the forwarding component and the entry reading command, namely, which forwarding component the entry reading command is sent from. At block S105, after reading the first forwarding entry from the storage 103, the storage controller 104 may transmit the first forwarding entry to the cache 105. The cache 105 may transmit the first forwarding entry to a corresponding forwarding component according to the recorded corresponding relationship.

After the storage 103 reads the first forwarding entry, the cache 105 may cache the first forwarding entry, as shown in FIG. 5, following blocks may be included.

At block S201, a second Hash bucket in an invalid state may be searched for according to the storage address of the first forwarding entry.

Hash operation may be performed on the storage address of the first forwarding entry so as to obtain a Hash value, the obtained Hash value may be used as an index to search for a corresponding Hash bucket line, namely the first Hash bucket line, and the second Hash bucket may be searched for from the first Hash bucket line.

At block S202, it is determined whether the second Hash bucket is found. Block S203 may be executed when the second Hash bucket is found; otherwise block S204 may be executed.

At block S203, the first forwarding entry may be written into the cache space corresponding to the second Hash bucket, the state of the second Hash bucket may be updated to be valid, a storage address contained in the second Hash bucket may be updated to be the storage address of the first forwarding entry, and the timestamp contained in the second Hash bucket may be updated to be the current time.

At block S203, the first forwarding entry may be written into a second entry corresponding to the second Hash bucket, and the state tag contained in the second Hash bucket may be updated to be valid.

At block S204, a third Hash bucket may be searched for according to the storage address of the first forwarding entry, wherein a differential between a timestamp contained in the third Hash bucket and the current time is greater than a predetermined timeout.

At block S204, the third Hash bucket may be searched for from the first Hash bucket line.

At block S205, it is determined whether the third Hash bucket is found, block S206 may be executed when the third Hash bucket line is found, otherwise, this flow may be quitted.

At block S206, the first forwarding entry may be written into the cache space corresponding to the third Hash bucket, the timestamp contained in the third Hash bucket may be updated to be the current time, and a storage address contained in the third Hash bucket may be updated to be the storage address of the first forwarding entry.

At block S206, the first forwarding entry may be written into a third entry corresponding to the third Hash bucket.

Apparently, the first forwarding entry may not be cached when neither the second Hash bucket nor the third Hash bucket is present in the first Hash bucket line.

In the flow as shown in FIG. 5, after a new forwarding entry is read from the storage 103, cache space occupied by an aged forwarding entry may be provided again to the newly read forwarding entry for use, thereby improving a utilization ratio of the cache space.

In addition, the Hash table may be periodically scanned in order to update the state of an aged forwarding entry to be invalid, which is convenient for a forwarding entry newly read from the storage to be cached subsequently. Therefore, the following blocks may be periodically executed: determining, for each Hash bucket, whether a differential between the timestamp contained in the Hash bucket and the current time is greater than a predetermined timeout, and updating the state of the Hash bucket to be invalid when the differential is greater than the predetermined timeout.

It is to be noted that by periodically scanning the Hash table, a state tag of each Hash bucket may be updated before triggering searching of the forwarding entry. Therefore, when searching for the forwarding entry, it may be determined whether the Hash bucket and the entry corresponding to the Hash bucket may be covered by a new forwarding entry only according to the state tag and the storage address, thereby reducing operation stress of the cache. The sequential execution manner of determining the Hash bucket to be valid and then determining the timestamp may be based on the searching every time, thereby reducing operation stress of periodic scanning. The way for processing the timestamp may be determined according to the size of the Hash table in the cache and the update situation in the cache. When the specification of the Hash table is larger and update in the cache is less, the stress of periodic scanning is relatively larger; in this case, the sequential execution manner may be adopted. However, when the specification of the Hash table is smaller and update in the cache is more, the operation stress of determining using the sequential execution manner is relatively larger; in this case, the periodic scanning may be adopted.

In addition, the cache 105 may further monitor an entry writing command sent to the storage 103, wherein the entry writing command carries a storage address of a second forwarding entry to be written in the storage. For example, a write interface of the storage controller 104 may be monitored, wherein the write interface is an interface configured to receive all entry writing commands sent to the storage 103. The entry writing commands may be sent by the CPU 101, the forwarding component 102 or other modules on which forwarding entries are to be updated. To save monitoring workload of the cache 105 and improve a monitoring efficiency, the cache 105 may only monitor an entry writing command sent to the storage 103 that satisfies the following condition, wherein the condition may include: the storage address of the second forwarding entry carried in the entry writing command being within a corresponding storage address range.

For example, the total store space of the storage 103 is 4 GB, wherein the storage address range of 1 GB-2.5 GB and the storage address range of 3 GB-3.5 GB may be used for storing forwarding tables. Therefore, the cache 105 may only monitor the entry writing commands carrying a storage address within the two storage address ranges. Alternatively, a plurality of cache may exist between the forwarding component 102 and the storage 103, and one storage address range may be allocated to one of the cache. In this way, each cache may only monitor the entry writing commands carrying a storage address within the corresponding storage address range.

After monitoring any entry writing command, the cache 105 may search, according to the storage address of the second forwarding entry carried in the entry writing command, for a fourth Hash bucket in a valid state containing a storage address identical to the storage address of the second forwarding entry. The state of the fourth Hash bucket may be updated to be invalid when the fourth Hash bucket is found. Specifically, Hash operation may be performed on the storage address of the second forwarding entry so as to obtain a Hash value, the obtained Hash value may be used as an index to search for a corresponding Hash bucket line, which may be referred to as a second Hash bucket line for convenience of description, and then the fourth Hash bucket may be searched for from the second Hash bucket line. When the fourth Hash bucket is found, this may indicate that the second forwarding entry is cached in a fourth entry corresponding to the fourth Hash bucket, and a state tag contained in the fourth Hash bucket may be updated to be invalid.

In addition, the cache 105 may receive an entry reading command sent from the forwarding component, and may also monitor an entry writing command sent to the storage. In some examples, the entry writing command may be first processed. In this way, when updating of forwarding entry occurs in the storage, it may be ensured that a corresponding forwarding entry in the cache 105 is timely updated.

In the method of the examples of the present disclosure, the cache may be added between the forwarding component and the storage. The cache may process an entry reading command from the forwarding component, and locally search, according to the storage address of the forwarding entry to be read that is carried in the entry reading command, for a Hash bucket in a valid state containing a storage address identical to the storage address of the forwarding entry. When the Hash bucket is found, it may indicate that the forwarding entry is cached in the cache and is cached in the cache space corresponding to the Hash bucket. In this case, the cached forwarding entry may be transmitted to the forwarding component. When the Hash bucket is not found, it may indicate that the forwarding entry is not cached in the cache. In this case, after the forwarding entry is read from the storage, the read forwarding entry may be transmitted to the forwarding component.

The above method implements a scheme for caching a forwarding entry. The cache may only process an entry reading command sent from the forwarding component, thereby ensuring a higher performance in reading an entry. Furthermore, the cache may learn which forwarding entries in the storage are to be updated by monitoring an entry writing command sent to the storage, and update the state of the corresponding forwarding entry cached in the cache to be invalid. Subsequently, after receiving the entry reading command for reading the forwarding entry, which is sent from the forwarding component, the cache may read the updated forwarding entry from the storage and cache the forwarding entry. In this way, updating of the forwarding entry may be more simply achieved.

Corresponding to the examples of the foregoing method for accessing a forwarding entry, the present disclosure further provides examples of a network device.

Figure 6:
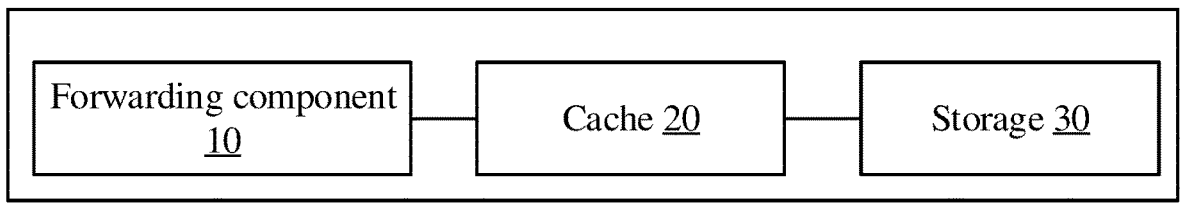
FIG. 6 illustrates a schematic structural diagram of a network device according to an exemplary example of the present disclosure.

The network device may be implemented by means of software, or may be implemented by way of hardware or a combination of software and hardware. From the point of view of hardware, the network device may be implemented by way of an FPGA. Referring to FIG. 6, the network device in the examples of the present disclosure may include: a forwarding component 10, a cache 20 and a storage 30. The forwarding component 10 and the cache 20 may be arranged on an FPGA chip. After the FPGA is powered on, an FPGA framework document may be loaded by the FPGA to form a plurality of modules, including the forwarding component 10 and the cache 20, etc. The storage 30 may be a separate storage medium such as DDR SDRAM, or may be implemented together with the forwarding component 10 and the cache 20 by means of the FPGA.

Figure 7:
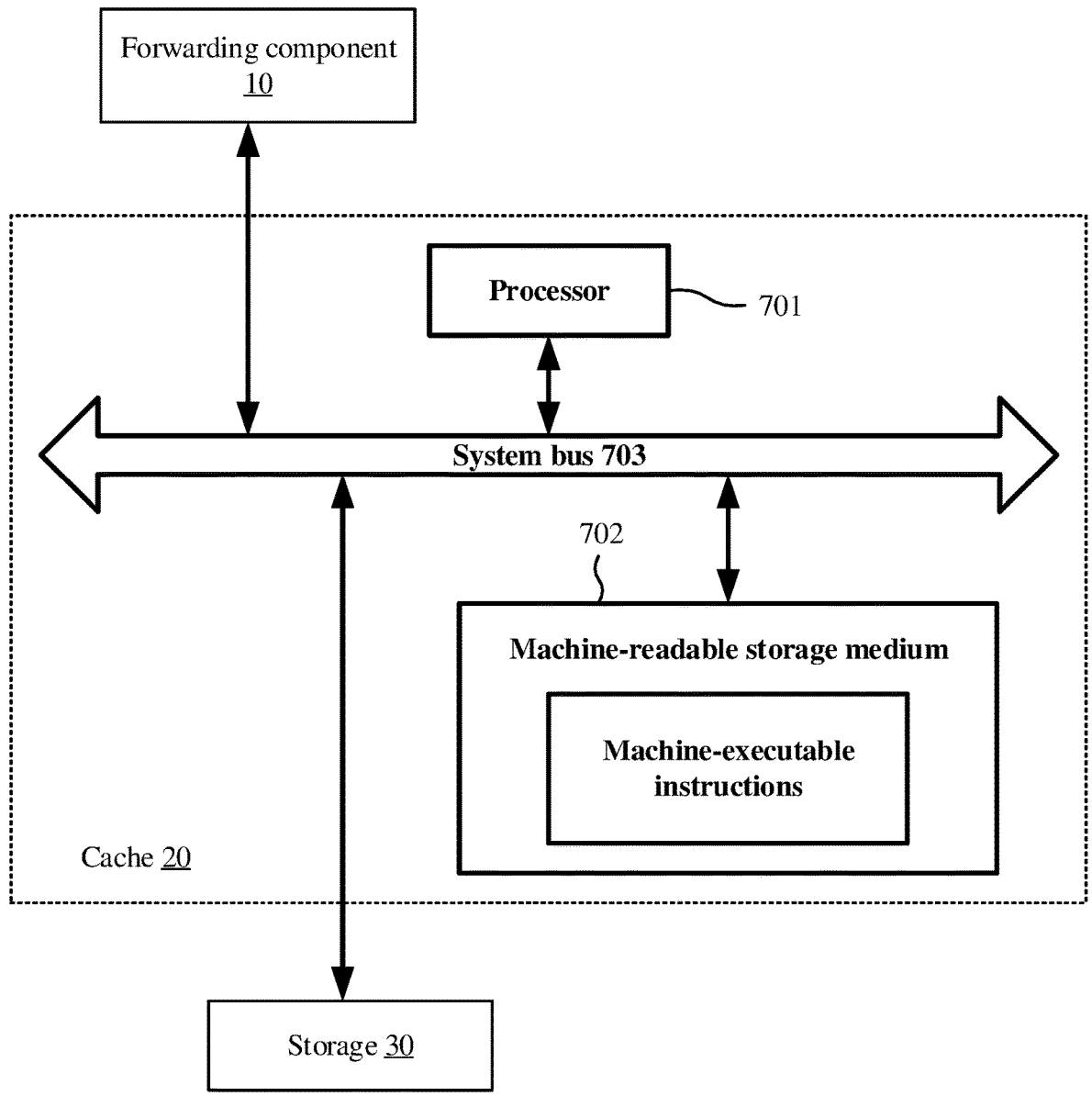
FIG. 7 illustrates another schematic structural diagram of a network device according to an exemplary example of the present disclosure.

In another example, the network device may be implemented by means of a combination of software and hardware. As shown in FIG. 7, the network device may include the forwarding component 10, the cache 20 and the storage 30. The cache 20 may include a processor 701 and a machine-readable storage medium 702 in which machine-executable instructions are stored. The processor 701 may communicate with the machine-readable storage medium 702 via a system bus 703. The processor 701 may perform the above-described method for accessing a forwarding entry by reading and executing the machine-executable instructions corresponding to a forwarding entry accessing control logic in the machine-readable storage medium 702.

The machine-readable storage medium 702 as mentioned herein may be any electronic, magnetic, optical or other physical memory devices, which may contain or store information such as executable instructions or data, etc. For example, the machine-readable storage medium may be a random access memory (RAM), a volatile memory, a non-volatile memory, a flash memory, a memory drive (such as a hard disk drive), a solid state drive, any type of memory disks (such as an optical disk or a DVD and so on), or similar storage medium or a combination thereof.

Figure 8:
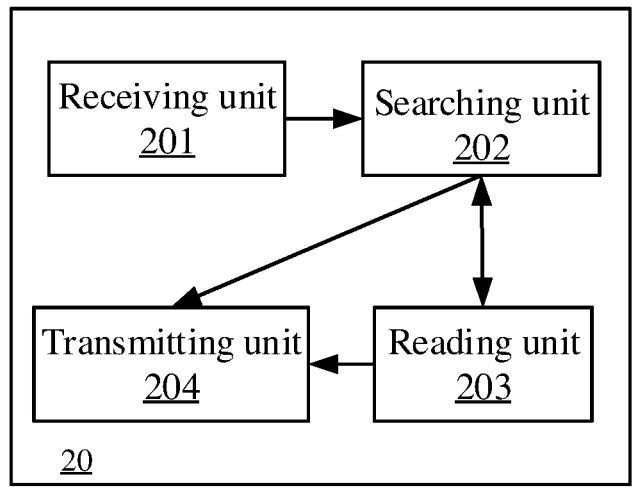
FIG. 8 illustrates a schematic diagram of functional modules included in a forwarding entry accessing control logic according to an exemplary example of the present disclosure.

As shown in FIG. 8, functionally divided, the forwarding entry accessing control logic may include following modules:

a receiving unit 201, configured to receive an entry reading command sent from the forwarding component 10, wherein the entry reading command carries a storage address in the storage 30 of a first forwarding entry to be read;

a searching unit 202, configured to search, from the cache 20 according to the storage address of the first forwarding entry, for a first Hash bucket in a valid state containing a storage address identical to the storage address of the first forwarding entry after the receiving unit 201 receives the entry reading command;

a reading unit 203, configured to read the first forwarding entry from the storage 30 when the searching unit 202 does not find the first Hash bucket; and a transmitting unit 204, configured to transmit, to the forwarding component 10, the first forwarding entry cached in cache space corresponding to the first Hash bucket when the searching unit 202 finds the first Hash bucket, and transmit the first forwarding entry read by the reading unit 203 to the forwarding component 10 when the searching unit 202 does not find the first Hash bucket.

Figure 9:
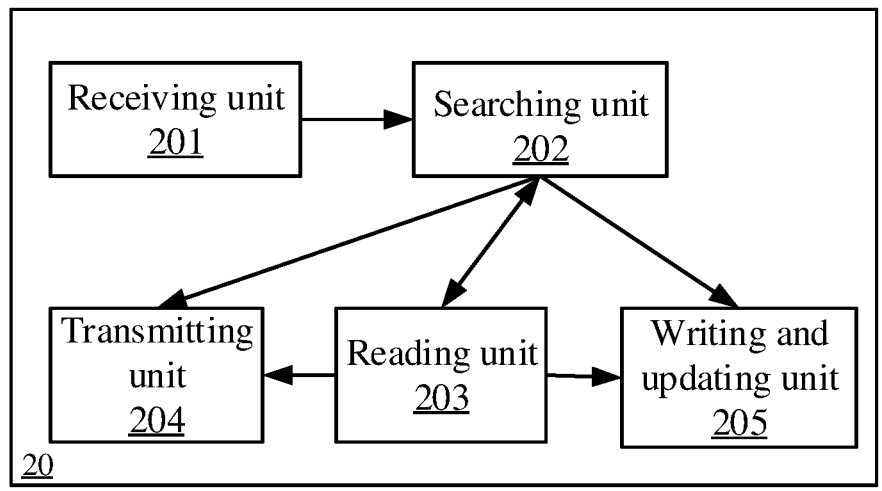
FIG. 9 illustrates a schematic diagram of functional modules included in a forwarding entry accessing control logic according to another exemplary example of the present disclosure.

In addition, as shown in FIG. 9, the cache 20 may further include a writing and updating unit 205.

The searching unit 202 may be further configured to search for a second Hash bucket in an invalid state according to the storage address of the first forwarding entry after the reading unit 203 reads the first forwarding entry from the storage 30.

The writing and updating unit 205 may be configured to write the first forwarding entry read by the reading unit 203 into cache space corresponding to the second Hash bucket after the searching unit 202 finds the second Hash bucket, update the state of the second Hash bucket to be valid, and update a storage address contained in the second Hash bucket to be the storage address of the first forwarding entry.

The Hash bucket further contains a timestamp. The writing and updating unit 205 may be further configured to update the timestamp contained in the first Hash bucket to a time indicating when the transmitting unit 204 transmits the first forwarding entry cached in the cache space corresponding to the first Hash bucket to the forwarding component 10, and update the timestamp contained in the second Hash bucket to be a time indicating when the first forwarding entry read by the reading unit 203 is written into the cache space corresponding to the second Hash bucket.

When the second Hash bucket is not found, the searching unit 202 may be further configured to search for a third Hash bucket according to the storage address of the first forwarding entry, wherein a differential between a timestamp contained in the third Hash bucket and the current time is greater than a predetermined timeout.

When the searching unit 202 finds the third Hash bucket, the writing and updating unit 205 may be further configured to write the first forwarding entry read by the reading unit 203 into cache space corresponding to the third Hash bucket, update the timestamp contained in the third Hash bucket to be a time indicating when the first forwarding entry is written into the cache space corresponding to the third Hash bucket, and update a storage address contained in the third Hash bucket to be the storage address of the first forwarding entry.

The writing and updating unit 205 may be further configured to determine, for each Hash bucket, whether a differential between the timestamp contained in the Hash bucket and the current time is greater than the predetermined timeout, and update the state of the Hash bucket to be invalid when the differential is greater than the predetermined timeout.

Figure 10:
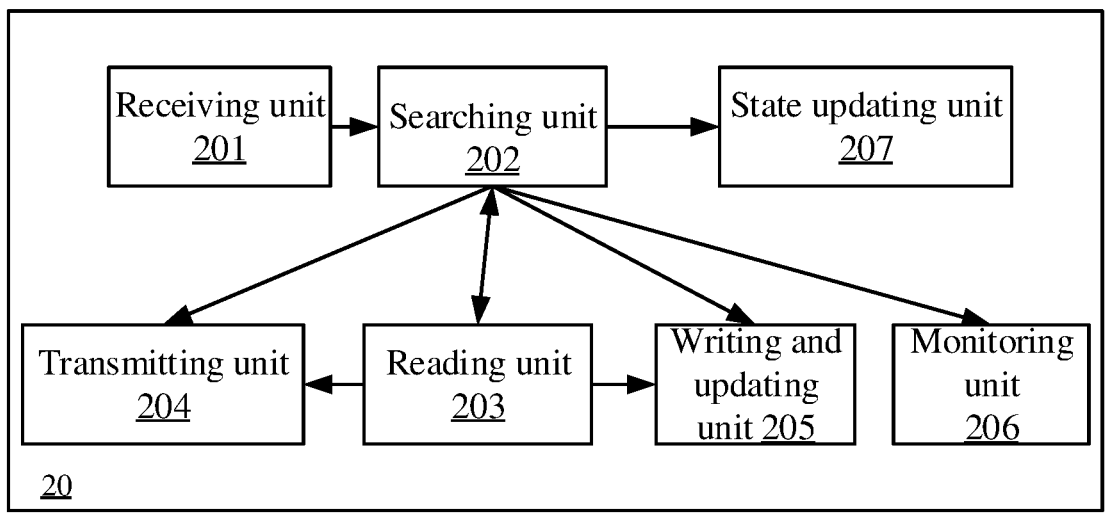
FIG. 10 illustrates a schematic diagram of functional modules included in a forwarding entry accessing control logic according to still another exemplary example of the present disclosure.

As shown in FIG. 10, the cache 20 may further include a monitoring unit 206 and a state updating unit 207.

The monitoring unit 206 may be configured to monitor an entry writing command sent to the storage 30, wherein the entry writing command carries a storage address of a second forwarding entry to be written in the storage 30.

After the monitoring unit 206 monitors the entry writing command, the searching unit 202 may be further configured to search, according to the storage address of the second forwarding entry, for a fourth Hash bucket in a valid state containing a storage address identical to the storage address of the second forwarding entry.

The state updating unit 207 may be configured to update the state of the fourth Hash bucket to be invalid when the searching unit 202 finds the fourth Hash bucket.

The monitoring unit 206 may be further configured to monitor an entry writing command sent to the storage 30 that satisfies the following condition, wherein the condition may include: the storage address of the second forwarding entry carried in the entry writing command is within a corresponding storage address range.

Implementations of functions and roles of units in the above device are specifically seen in detail in implementations of corresponding blocks in above methods, not elaborated herein.

Apparatus examples are basically corresponding to method examples, thus method examples can serve as reference. The apparatus examples set forth above are merely exemplary, wherein units described as detached parts can be or not be detachable physically; parts displayed as units can be or not be physical units, i.e., either located at the same place, or distributed on a plurality of network units. Modules can be selected in part or in whole according to the actual needs for realization of solutions of the present disclosure. It is conceivable and executable for those of ordinary skill in the art without creative labor.

Terms used in the present disclosure are only for the purpose of description of specific examples, and are not intended to limit the present disclosure. As used in the present disclosure and appended claims, the singular forms "a/an", "said" and "the" intend to also include the plural form, unless the content clearly dictates otherwise. It should also be understood that the term "and/or" used herein means to include arbitrary and all possible combinations of one or more items listed in association.

Terms such as "first", "second", "third" and the like may be used in the present disclosure for description of information. However, the information shall not be restricted to these terms. These terms are only intended to distinguish among information of the same type. For example, under the circumstance of not departing from the scope of the present disclosure, a first information can also be referred to as a second information, similarly, a second information can also be referred to as a first information. Depending on the context, term "if" used herein can be interpreted as "when", "while" or "in response to determining".

The embodiments set forth above are only illustrated as preferred embodiments of the present disclosure, and are not intended to limit the present disclosure. All modifications, equivalent substitutions and improvements made within the spirit and principles of the present disclosure shall fall within the protection scope of the present disclosure.

The invention claimed is:

1. A method of accessing a forwarding entry, comprising:
receiving, by a cache, an entry reading command sent from a forwarding component, wherein the entry reading command carries a storage address in a storage of a first forwarding entry to be read;
searching, by the cache, for a first Hash bucket in a valid state in the cache according to the storage address of the first forwarding entry, wherein, the first Hash bucket contains a storage address which is identical to the storage address of the first forwarding entry; and when the first Hash bucket is found in the cache, determining, by the cache, that the first forwarding entry is stored in the cache, transmitting, by the cache, to the forwarding component, the first forwarding entry cached in a cache space corresponding to the first Hash bucket; and when the first Hash bucket is not found in the cache, reading, by the cache, the first forwarding entry from the storage, and transmitting, by the cache, the read first forwarding entry to the forwarding component;
monitoring, by the cache, an entry writing command sent to the storage, wherein the entry writing command carries a storage address of a second forwarding entry which is to be written in the storage;
searching, by the cache, for a fourth Hash bucket in a valid state in the cache according to the storage address of the second forwarding entry, wherein the fourth Hash bucket contains a storage address which is identical to the storage address of the second forwarding entry; and updating, by the cache, a state of the fourth Hash bucket to be invalid when the fourth Hash bucket is found.

2. The method according to claim 1, wherein, after reading the first forwarding entry from the storage, the method further comprises:
searching, by the cache, for a second Hash bucket in an invalid state in the cache according to the storage address of the first forwarding entry; and when the second Hash bucket is found in the cache, writing, by the cache, the first forwarding entry into a cache space corresponding to the second Hash bucket, updating, by the cache, a state of the second Hash bucket to be valid, and updating, by the cache, a storage address contained in the second Hash bucket to be the storage address of the first forwarding entry.

3. The method according to claim 2, further comprises:
updating, by the cache, a timestamp contained in the first Hash bucket to a time indicating when the first forwarding entry cached in the cache space corresponding to the first Hash bucket is transmitted to the forwarding component; and updating, by the cache, a timestamp contained in the second Hash bucket to a time indicating when the first forwarding entry is written into the cache space corresponding to the second Hash bucket.

4. The method according to claim 3, wherein, the method further comprises:

searching, by the cache, for a third Hash bucket in the cache according to the storage address of the first forwarding entry when the second Hash bucket is not found, wherein, a difference between a timestamp contained in the third Hash bucket and a current time is greater than a predetermined timeout; and when the third Hash bucket is found in the cache, writing, by the cache, the first forwarding entry into a cache space corresponding to the third Hash bucket, updating, by the cache, a timestamp contained in the third Hash bucket to a time indicating when the first forwarding entry is written into the cache space corresponding to the third Hash bucket, and updating, by the cache, a storage address contained in the third Hash bucket to be the storage address of the first forwarding entry.

5. The method according to claim 3, wherein, the method further comprises:
determining, by the cache, for each Hash bucket, whether a difference between the timestamp contained in each Hash bucket and the current time is greater than the predetermined timeout; and updating, by the cache, the state of each Hash bucket to be invalid when the difference is greater than the predetermined timeout.

6. The method according to claim 1, wherein, monitoring the entry writing command sent to the storage, comprises:
monitoring, by the cache, an entry writing command sent to the storage that satisfies such a condition that the storage address of the second forwarding entry carried in the entry writing command is within a storage address range.

7. A network device, comprising:
a forwarding component, a cache and a storage, wherein, each of the forwarding component and the cache is implemented as a single chip, or implemented by field programmable gate array (FPGA), and wherein the forwarding component sends out an entry reading command for acquiring a forwarding entry, so as to perform packet forwarding according to the acquired forwarding entry; the storage stores a forwarding entry for packet forwarding; and the cache
receives the entry reading command sent from the forwarding component, wherein the entry reading command carries a storage address in the storage of a first forwarding entry to be read;
searches for a first Hash bucket in a valid state in the cache according to the storage address of the first forwarding entry, wherein the first Hash bucket contains a storage address identical to the storage address of the first forwarding entry;
transmits, to the forwarding component, the first forwarding entry cached in a cache space corresponding to the first Hash bucket when the first Hash bucket is found; and reads the first forwarding entry from the storage and transmits the read first forwarding entry to the forwarding component when the first Hash bucket is not found;
wherein the cache further monitors an entry writing command sent to the storage, wherein the entry writing command carries a storage address of a second forwarding entry which is to be written in the storage;
the cache further searches for a fourth Hash bucket in a valid state in the cache according to the storage address of the second forwarding entry when the entry writing command is monitored, wherein the fourth Hash bucket contains a storage address identical to the storage address of the second forwarding entry; and the cache updates a state of the fourth Hash bucket to be invalid when the fourth Hash bucket is found.

8. The network device according to claim 7, wherein the cache further searches for a second Hash bucket in an invalid state in the cache according to the storage address of the first forwarding entry, after reading the first forwarding entry from the storage; and when the second Hash bucket is found in the cache, the cache writes the first forwarding entry into a cache space corresponding to the second Hash bucket, updates a state of the second Hash bucket to be valid, and updates a storage address contained in the second Hash bucket to be the storage address of the first forwarding entry.

9. The network device according to claim 8, wherein the cache updates the timestamp contained in the first Hash bucket to a time indicating when the first forwarding entry cached in the cache space corresponding to the first Hash bucket is transmitted to the forwarding component, and updates the timestamp contained in the second Hash bucket to be a time indicating when the first forwarding entry is written into the cache space corresponding to the second Hash bucket.

10. The network device according to claim 9, wherein the cache searches for a third Hash bucket in the cache according to the storage address of the first forwarding entry when the second Hash bucket is not found, wherein, a difference between a timestamp contained in the third Hash bucket and a current time is greater than a predetermined timeout; and when the third Hash bucket is found in the cache, the cache writes the first forwarding entry into a cache space corresponding to the third Hash bucket, updates a timestamp contained in the third Hash bucket to a time indicating when the first forwarding entry is written into the cache space corresponding to the third Hash bucket, and updates a storage address contained in the third Hash bucket to be the storage address of the first forwarding entry.

11. The network device according to claim 9, wherein the cache determines, for each Hash bucket, whether a difference between the timestamp contained in each Hash bucket and the current time is greater than the predetermined timeout; and the cache updates the state of each Hash bucket to be invalid when the difference is greater than the predetermined timeout.

12. The network device according to claim 7, wherein the cache further monitors an entry writing command sent to the storage that satisfies such a condition that the storage address of the second forwarding entry carried in the entry writing command is within a storage address range.

13. A network device, comprising:
a central processing unit (CPU);
a field programmable gate array (FPGA); and a storage; wherein
the CPU loads an FPGA framework document onto the FPGA so as to be executed by the FPGA, so that the FPGA comprises a forwarding component, a cache and a storage controller;
wherein, each of the forwarding component, the cache, and the storage controller is implemented as a single programmable circuit module on the FPGA;
the forwarding component sends out an entry reading command for acquiring a forwarding entry, so as to perform packet forwarding according to the acquired forwarding entry;
the cache receives the entry reading command sent from the forwarding component, wherein the entry reading command carries a storage address in the storage of a first forwarding entry to be read, searches for a first Hash bucket in a valid state in the cache according to the storage address of the first forwarding entry, wherein the first Hash bucket contains a storage address identical to the storage address of the first forwarding entry, transmits, to the forwarding component, the first forwarding entry cached in a cache space corresponding to the first Hash bucket when the first Hash bucket is found; and reads the first forwarding entry from the storage and transmits the read first forwarding entry to the forwarding component when the first Hash bucket is not found monitors an entry writing command sent to the storage, wherein the entry writing command carries a storage address of a second forwarding entry which is to be written in the storage, searches for a fourth Hash bucket in a valid state in the cache according to the storage address of the second forwarding entry, wherein the fourth Hash bucket contains a storage address which is identical to the storage address of the second forwarding entry, and updates a state of the fourth Hash bucket to be invalid when the fourth Hash bucket is found; and the storage controller is configured to control read-write of the storage.

* * * * *